US012624134B2

(12) United States Patent　　(10) Patent No.: US 12,624,134 B2
Godon et al.　　(45) Date of Patent: May 12, 2026

(54) POLYMER COMPOSITION FOR CAPS AND CLOSURES

(71) Applicant: INEOS EUROPE AG, Vaud (CH)

(72) Inventors: Pascale Godon, Ittre (BE); Luc Marie Ghislain Dheur, Woluwe-Saint-Lambert (BE)

(73) Assignee: INEOS EUROPE AG, Vaud (CH)

( * ) Notice: Subject to any disclaimer, the term of this patent is extended or adjusted under 35 U.S.C. 154(b) by 540 days.

(21) Appl. No.: 18/258,805

(22) PCT Filed: Dec. 16, 2021

(86) PCT No.: PCT/EP2021/086246

§ 371 (c)(1),
(2) Date: Jun. 21, 2023

(87) PCT Pub. No.: WO2022/136121

PCT Pub. Date: Jun. 30, 2022

(65) Prior Publication Data

US 2024/0043580 A1　　Feb. 8, 2024

(30) Foreign Application Priority Data

Dec. 22, 2020 (EP) ..................................... 20216471

(51) Int. Cl.
| | |
|---|---|
| *C08F 10/02* | (2006.01) |
| *B29C 45/00* | (2006.01) |
| *B29K 23/00* | (2006.01) |
| *B29L 31/00* | (2006.01) |
(Continued)

(52) U.S. Cl.
CPC .......... *C08F 10/02* (2013.01); *B29C 45/0001* (2013.01); *C08F 2/001* (2013.01); *C08L 23/06* (2013.01); *B29K 2023/0608* (2013.01); *B29L 2031/7158* (2013.01); *C08F 2500/05* (2013.01);
(Continued)

(58) Field of Classification Search
CPC .......... C08L 2205/025; C08L 23/04–08; C08F 2500/05; C08F 2500/12; C08F 2500/13; C08F 10/02; C08F 10/04; C08F 110/02; C08F 210/02
See application file for complete search history.

(56) References Cited

U.S. PATENT DOCUMENTS 9,783,664 B1 * 10/2017 Wang .................... B29C 43/021

FOREIGN PATENT DOCUMENTS

| EP | 1655336 A1 | 5/2006 |
|---|---|---|
| EP | 1655338 A1 | 5/2006 |
| EP | 1674490 A1 | 6/2006 |
(Continued)

OTHER PUBLICATIONS

International Search Report and Written Opinion of the ISA for PCT/EP2021/086246 mailed May 17, 2022, 9 pages.

*Primary Examiner* — Kregg T Brooks
(74) *Attorney, Agent, or Firm* — Nixon & Vanderhye PC

(57) ABSTRACT

Polyethylene composition has a density of 949-955 kg/m 3 and a melt index $MI_2$ between 15 and 40 g/10 min, and comprises a low molecular weight fraction (A) and a high molecular weight fraction (B), wherein the amount of (A) is 52-58 wt % based on the weight of (A)+(B), and the melt index $MI_2$ of (A) is 200-600 g/10 min. Injection moulded articles, preferably caps or closures, made from the composition are also described.

19 Claims, 1 Drawing Sheet

1 = injection pressure curve
2 = integrated area between points A and B
3 = mean value of integrated area

(51) Int. Cl.
    *C08F 2/00* (2006.01)
    *C08L 23/06* (2006.01)
(52) U.S. Cl.
    CPC ..... *C08F 2500/12* (2013.01); *C08L 2205/025* (2013.01)

(56) References Cited

FOREIGN PATENT DOCUMENTS

| | | | |
|---|---|---|---|
| EP | 3040375 | A1 | 7/2016 |
| WO | 0071615 | A1 | 11/2000 |
| WO | 2004031291 | A2 | 4/2004 |
| WO | 2007018720 | A1 | 2/2007 |
| WO | 2007130515 | A2 | 11/2007 |
| WO | 2007140114 | A2 | 12/2007 |
| WO | 2011004032 | A1 | 1/2011 |
| WO | 2015101668 | A1 | 7/2015 |

* cited by examiner

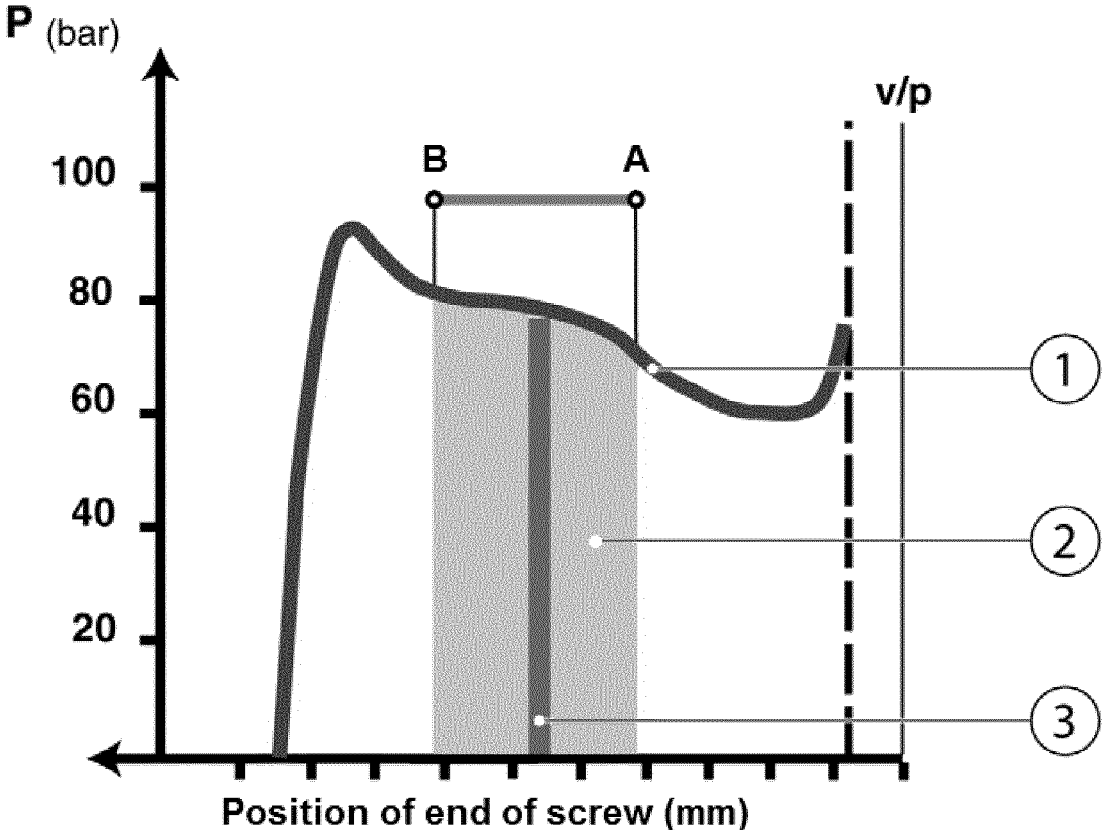
1 = injection pressure curve
2 = integrated area between points A and B
3 = mean value of integrated area

POLYMER COMPOSITION FOR CAPS AND CLOSURES

CROSS-REFERENCE TO RELATED APPLICATIONS

This application is the U.S. national phase of International Application No. PCT/EP2021/086246 filed Dec. 16, 2021, which designated the U.S. and claims priority to EP 20216471.1 filed Dec. 22, 2020, the entire contents of each of which are hereby incorporated by reference.

The present invention relates to novel ethylene polymer compositions and to articles made therefrom, particularly articles made by injection moulding such as caps and closures.

Injection moulding may be used to make a wide variety of articles including articles having relatively complex shapes and a range of sizes. A particularly important application is in the manufacture of caps and closures for food and drink applications, such as for bottles containing carbonated or non-carbonated drinks, or for non-food applications such as containers for cosmetics or pharmaceuticals.

Important properties of the polymer to be injection moulded are its rheology, stiffness, environmental stress crack resistance (ESCR) and organoleptic properties, requirements for all of which need to be satisfied at the same time. Injection moulded articles, particularly caps and closures, may be in contact with aggressive food and non-food media and/or subject to external stress, e.g. when used as a cap for a carbonated soft drink, and for such applications a high ESCR is therefore desirable. High ESCR values are generally obtained with polyethylenes of lower density and/or lower melt index. On the other hand, injection moulded articles also require a high stiffness as this allows a reduction in wall thickness while maintaining good dimensional stability. Stiffness generally increases as density increases.

It is also important in injection moulding that the polymer melt has the appropriate rheological properties, i.e. a flowability within certain limits to ensure that the final product properties are desirable. Certain applications, particular those in which the injection moulded article is larger or longer, require especially good flowability so that the polymer is able to flow to all areas of the mould when injected. Also, the higher the flow rate of the polymer melt, the greater the speed at which it can be injected into the mould and the shorter the processing time, which improves productivity.

For improving the flow properties, polyethylenes with broader molecular weight distribution or with higher melt index are typically chosen. However, polymers with higher melt index tend to yield products having poor ESCR. Different applications may require a different balance of ESCR and processability.

Monomodal polyethylenes are known commercially for use as caps or closures, an example being the Ineos product Rigidex® HD5226EA, which has a density of 953 kg/m$^3$ and an MI$_2$ of 26 g/10 min. Bimodal polyethylenes are also well known for such applications, as they can provide a better balance of properties.

WO 2007/130515 discloses polyethylene compositions suitable for caps and closures having a density of 950-960 kg/m$^3$ and a MI$_2$ of at least 1 g/10 min, preferably 1-2 g/10 min. All the inventive Examples have an MI$_2$ of 2 g/10 min or less.

EP 1655338A discloses a polyethylene composition for caps and closures which has an MI$_2$ of 0.1 to 100 g/10 min and a specific relationship between SHI$_{1/1000}$ and log MI$_2$. All the inventive Examples have an MI$_2$ of 11 g/10 min or less and a density of at least 961 kg/m$^3$, as well as an MI$_2$ of the low molecular weight (LMW) fraction below 60 g/10 min.

EP 1655336A also discloses a polyethylene composition for caps and closures having an MI$_2$ of 0.1 to 100 g/10 min, preferably below 15 g/10 min. All the inventive Examples have an MI$_2$ of about 1-2 g/10 min.

WO 2011/004032 discloses a bimodal polyethylene composition for caps and closures having a density of 940-960 kg/m$^3$ and a MI$_2$ of 0.5-50 g/10 min, preferably 0.5-2.2 g/10 min. All the inventive Examples have an MI$_2$ of 2 g/10 min or less.

WO 2004/031291 and WO 2007/018720 disclose bimodal polyethylene compositions for injection moulding having an MI$_2$ of 2-200 g/10 min, most preferably 4-10 g/10 min. All the inventive Examples have an MI$_2$ of 11 g/10 min or less, and most contain at least 65 wt % of the LMW fraction.

WO 2007/140114 discloses bimodal polyethylene compositions for injection moulded living hinges having an MI$_2$ of 10-70 g/10 min, most preferably 45-55 g/10 min. Although the broadest disclosure suggests that the lower molecular weight ethylene component, which has an MI$_2$ no higher than 150 g/10 min, can comprise as little as 30 wt % of the composition, the Examples all contain at least 75 wt % of the lower molecular weight ethylene component.

WO 2007/140114 discloses bimodal polyethylene compositions for injection moulded articles such as containers, having an MI$_2$ of 30-75 g/10 min, most preferably 45-55 g/10 min. The Examples have MI$_2$ values above 45 g/10 min and densities below 948 kg/m$^3$.

WO 00/071615 closes bimodal polyethylene compositions for injection moulded articles such as caps and closures having an MI$_2$ of 2 to 100 g/10 min, preferably 4-20 g/10 min, and a molecular weight distribution MWD of 5-100, most preferably 14-45. The Examples have MI$_2$ values below 5 g/10 min.

A problem for both monomodal and bimodal compositions with high melt indexes is ensuring that the mechanical properties such as ESCR are sufficiently good. In bimodal compositions the mechanical properties are largely due to the high molecular weight (UMW) fraction. However to obtain a low molecular weight (=high melt index) in the final composition, it is obviously necessary for the molecular weight of the HMW fraction also to be relatively low, and/or the amount of HMW fraction to be relatively low. The challenge is to find a combination of features which can provide very good processability as well as satisfactory mechanical properties.

We have now discovered novel polyethylene compositions which have particularly good processability as well as high stiffness and good ESCR.

The present invention provides a polyethylene composition having a density of 949-955 kg/m$^3$ and a melt index MI$_2$ between 15 and 40 g/10 min, which comprises a low molecular weight fraction (A) and a high molecular weight fraction (B), wherein the weight fraction of (A) is 52-58 wt % based on the weight of (A)+(B), and the melt index MI$_2$ of (A) is 200-600 g/10 min.

Preferably the composition has a density of 950-954 kg/m$^3$, more preferably 951-953 kg/m$^3$.

Preferably the composition has a melt index MI$_2$ between 19 and 37 g/10 min, preferably between 20 and 35 g/10 min and most preferably between 22 and 32 g/10 min.

Preferably the composition has a molecular weight distribution (measured by GPC analysis), Mw/Mn, of 5-10, more preferably 7-10.

Preferably the low molecular weight fraction (A) is an ethylene homopolymer. The high molecular weight fraction (B) is preferably an ethylene copolymer, preferably a copolymer of ethylene and a $C_4$-$C_8$ alpha-olefin.

The $SHI_{(1,100)}$ of the polyethylene composition is preferably between 2.5 and 8, more preferably between 3 and 6. The shear thinning index $SHI_{(1,100)}$ is the ratio of the complex viscosity at shear stresses of 1 kPa and 100 kPa, and is an indicator of the breadth of the molecular weight distribution.

The low molecular weight fraction (A) preferably has an $MI_2$ of between 250 and 550 g/10 min, more preferably between 300 and 500 g/10 min.

The high molecular weight fraction (B) preferably has a density of 918-928 kg/m$^3$, preferably 920-926 kg/m$^3$.

Preferably the weight fraction of (A) is 53-57 wt % and more preferably 54-56 wt %.

We have found that in order to obtain a composition which not only has good ESCR but also has a good combination of other properties, it is necessary not only to have a final melt index in the claimed range but also to select carefully both the weight fraction of (A) and its melt index. A weight fraction of (A) of at least 52 wt % and an $MI_2(A)$ of between 300 and 500 g/10 min ensures that the melt index of the high molecular weight fraction (B) can be relatively low—in other words, its molecular weight can be relatively high—whilst obtaining a final melt index in the desired range. This ensures that the composition has good stress crack resistance. However if the weight fraction of (A) or its melt index is increased too much then the molecular weight of (B) must be increased too much, which can lead to gels and warpage.

ESCR is influenced not only by the molecular weight of the (B), but also by the overall density. It is well known that reducing density can improve ESCR. However another important requirement for caps is good stiffness, which is known to increase with increasing density. It has been found that by controlling the molecular weight of (B) as discussed above, the overall density of the composition can be such that good stiffness is maintained whilst still achieving good ESCR. Thus it can be seen that obtaining the desired balance of ESCR, stiffness and processability requires the composition to have a particular combination of properties.

In a preferred embodiment, the polyethylene composition has a density of 950 to 954 kg/m$^3$, an $MI_2$ of between 20 and 35 g/10 min, a $SHI_{(1,100)}$ of between 2.5 and 8 and an Mw/Mn between 5 and 10.

In a more preferred embodiment, the polyethylene composition has a density of 950 to 954 kg/m$^3$, an $MI_2$ of between 22 and 32 g/10 min, a $SHI_{(1,100)}$ of between 3 and 6 and an Mw/Mn between 7 and 10.

A further aspect of the invention is injection moulded articles comprising the composition of the invention. Preferred articles are caps and closures.

The polyethylene composition of the invention is multimodal, in that it comprises at least two polyethylene components, including a low molecular weight fraction and a high molecular weight fraction. Most preferably it is bimodal, which means that it contains significant amounts of only the low molecular weight and high molecular weight fractions. The form of the molecular weight distribution curve (i.e. the appearance of the graph of the polymer weight fraction as function of its molecular weight) of a multimodal polyethylene will show two or more maxima or at least be distinctly broadened in comparison with the curves for the individual fractions. For example, if a polymer is produced in a sequential multistage process utilising reactors coupled in series with different conditions in each reactor, each of the polymer fractions produced in the different reactors will have its own molecular weight distribution and weight average molecular weight. The molecular weight distribution curve of such a polymer comprises the sum of the individual curves of the fractions, typically yielding a curve for the multimodal polymer having a substantially single peak or two or more distinct maxima. A "substantially single peak" may not follow a Gaussian distribution, may be broader than a Gaussian distribution would indicate, or have a flatter peak than a Gaussian distribution. Some substantially singular peaks may have a tail on either side of the peak. In some embodiments it may be possible to mathematically resolve a "substantially single peak" in a molecular weight distribution curve into two or more components by various methods.

Preferably the composition of the invention comprises only a low molecular weight fraction (A) and a high molecular weight fraction (B). However it may optionally further comprise a small prepolymerisation fraction in an amount of 5 wt % or less based on total polyethylene. Alternatively or additionally it may further comprise a fraction of very high molecular weight polymer, having a higher molecular weight than the aforementioned high molecular weight polymer, in an amount of 5 wt % or less based on total polyethylene.

The amount of low molecular weight fraction (A) present in the composition is preferably between 52 wt % and 58 wt % based on total polyethylene, more preferably between 53 wt % and 57 wt % and most preferably between 54 wt % and 56 wt %. The amount of high molecular weight fraction (B) present in the composition is preferably between 42 wt % and 48 wt %, more preferably between 43 wt % and 47 wt % and most preferably between 44 wt % and 46 wt %. These amounts correspond to the weight ratio of (A) to (B) in the case where these are the only two polyethylene fractions present in the composition. However as previously described, other polyethylene fractions may optionally be present in the composition.

For the purposes of the present invention, the term "homopolymer" is understood to denote an ethylene polymer composed essentially of monomer units derived from ethylene and substantially devoid of monomer units derived from other polymerisable olefins. It may contain trace amount of units derived from other polymerisable olefins which are present as impurities in the feed or recycle streams of the polymerisation process or which are carried over between stages in a multistage process, but it should contain at least about 99.7% by mole of ethylene repeating units, based on all the repeating units present in the "homopolymer". The term "copolymer of ethylene and a $C_4$-$C_8$ α-olefin" is understood to denote a copolymer comprising monomer units derived from ethylene and monomer units derived from a $C_4$-$C_8$ α-olefin and, optionally, from at least one other .alpha.-olefin. The $C_4$-$C_8$ α-olefin can be selected from olefinically unsaturated monomers comprising from 4 to 8 carbon atoms, such as, for example, 1-butene, 1-pentene, 1-hexene, 3-methyl-1-butene, 3- and 4-methyl-1-pentenes and 1-octene. Preferred alpha-olefins are 1-butene, 1-hexene and 1-octene and more particularly 1-butene. The other alpha-olefin which may also be present additional to the $C_4$-$C_8$ α-olefin is preferably selected from olefinically unsaturated monomers comprising from 3 to 8 carbon atoms, such as, for example, propylene, 1-butene, 1-pentene, 3-methyl-1-butene, 3- and 4-methyl-1-pentenes, 1-hexene and 1-octene.

The content in copolymer (B) of monomer units derived from $C_4$-$C_8$ α-olefin, hereinafter called comonomer content, is generally at least 0.05 mol %, preferably at least 0.1 mol %, more preferably at least 0.4 mol %. The comonomer content of copolymer (B) is usually at most 3 mol %, preferably at most 2 mol %, and more preferably no more than 1 mol %. Comonomer content in the overall composition is generally in the range 0.01-1 mol %, preferably in the range 0.05-0.8 mol %, more preferably in the range 0.1-0.7 mol % and most preferably in the range 0.2-0.5 mol %.

For the purposes of the present invention, the $C_4$-$C_8$ alpha-olefin content is measured by $^{13}C$ NMR according to the method described in J. C. Randall, JMS-Rev. Macromol. Chem. Phys., C29 (2&3), p. 201-317 (1989), that is to say that the content of units derived from $C_4$-$C_8$ alpha-olefin is calculated from the measurements of the integrals of the lines characteristic of that particular $C_4$-$C_8$ alpha-olefin in comparison with the integral of the line characteristic of the units derived from ethylene (30 ppm). A composition composed essentially of monomer units derived from ethylene and a single $C_4$-$C_8$ alpha-olefin is particularly preferred. The preferred single $C_4$-$C_8$ α-olefin is selected from 1-butene, 1-hexene and 1-octene; 1-butene is particularly preferred.

If polymers (A) and (B) are made separately and then blended, it is possible to measure directly the melt index, density and comonomer content of both polymers. However, if the multimodal polymer is made in a multistage process in which one polymer is made prior to the other and then the second polymer is made in the presence of the first polymer, then the melt index, density and comonomer content of the second polymer cannot be measured, and instead for the purposes of this invention they are defined as below. The definitions below would also apply to a third or subsequent polymer (if one is present) which is made in the presence of the first two polymers.

All melt indices such as HLMI and $MI_2$ of the second (or third or subsequent) polymer are defined as being the value directly measured for the second (or third or subsequent) polymer when made separately under the same polymerisation conditions as used to make the multimodal composition. In other words, the second (or third or subsequent) polymer is made separately using the same catalyst and under the same polymerisation conditions as those employed in the second (or third or subsequent) reactor of the multimodal polymerisation, and its melt index is then measured. As an alternative, the melt index of the second (or third or subsequent) polymer can also be calculated using a composition law, typically of the general form $$MI2(final)=[p1*MI2_A^{-K}+(1-p1)*MI2_B^{-K}]^{(-1/K)},$$

where k is determined empirically, for example by using blended compositions made in two separate reactors where the melt index can be measured directly. An example of such a law is described in "Prediction of melt flow rate (MFR) of bimodal polyethylenes based on MFR of their components", Bengt Hagström, Conference of Polymer Processing in Gothenburg, 19-21/08/1997. In some cases $MI_2$ may be too low to be conveniently measured: in these cases either $MI_5$ or high load melt index ($I_{21}$) is measured, and that value converted to an equivalent $MI_2$. Such conversion between different melt index measurements is familiar to the person skilled in the art.

The density of the second (or third or subsequent) polymer is defined as being that calculated from the relationship:

$$\text{density (composition)} = \sum_{1}^{n} x_n \cdot d_n \qquad \text{(Equation 1)}$$

where x is the weight fraction of component n, d is the density of component n, and n is the number of polymers in the composition.

The comonomer content of the second (or third or subsequent) polymer is defined as being that calculated from the relationship:

$$\text{comonomer content (composition)} = \sum_{1}^{n} x_n \cdot c_n \qquad \text{(Equation 2)}$$

where x is the weight fraction of component n, c is the comonomer content of component n, and n is the number of polymers in the composition.

If the polymer is made with a "multiple catalyst system" such as a bimetallic catalyst, it is possible to make both polymers (A) and (B) in the same reactor. In such a case it is not possible to measure directly the properties of either polymer (A) or polymer (B). Therefore in this case the properties of both polymers (A) and (B) are defined as being those obtained when the respective polymers are prepared separately using the individual catalysts of the "multiple catalyst system", and under the same polymerisation conditions as those employed for making the multimodal polymer composition.

Whilst the compositions of the invention may consist entirely of the polyethylene described above, the invention includes within its scope compositions comprising other components in addition to the polyethylene. In particular, the composition may contain conventional additives in an amount of up to 10 wt %, preferably up to 5 wt % and more preferably up to 3 wt % based on the total weight of the composition. Such additives include stabilizers (antioxidizing agents and/or anti-UV agents), antistatic agents processing aids and slip agents, as well as pigments. The composition may also contain up to 5 wt % of another polyolefin.

The preferred polyethylene composition of the invention may be produced by any of the methods known in the art, such as mechanically blending polymers (A) and (B) and optionally other polyethylenes, in situ formation of polymers (A) and (B) in the presence of a "multiple catalyst system", and formation of polymers (A) and (B) in a multistage process. Blending may be carried out in any conventional blending apparatus.

By a "multiple catalyst system" is meant a composition, mixture or system including at least two different catalyst compounds, each having the same or a different metal group, including a "dual catalyst," e.g., a bimetallic catalyst. Use of a multiple catalyst system enables a multimodal product to be made in a single reactor. Each different catalyst compound of the multiple catalyst system may reside on a single support particle, in which case a dual (bimetallic) catalyst is considered to be a supported catalyst. However, the term bimetallic catalyst also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerisation is conducted in the presence of the bimetallic catalyst system, i.e., the two collections of supported catalysts. Alternatively, the multiple catalyst system includes a mixture of unsupported catalysts in slurry form. One catalyst may be used to produce the HMW component, and the other may be used to produce the LMW component. The LMW catalyst is usually more responsive to chain termination reagents, such as hydrogen, than the HMW catalyst.

However the polyethylene composition of the invention is preferably obtained by a multistage ethylene polymerisation, typically using a series of reactors. A multistage process is a polymerisation process in which a polymer comprising two or more fractions is produced by producing at least two polymer fraction(s) in separate reaction stages, usually with different reaction conditions in each stage, in the presence of the reaction product of the previous stage. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc.

It is preferred that the polymer (A) is produced in the first reactor, and that polymer (B) is produced in a subsequent reactor. However this order may be reversed. If the multimodal composition includes a prepolymer, this is made in a reactor preceding the first reactor. It is preferred that all reactors are slurry reactors, in particular slurry loop reactors.

In a particularly preferred multistage polymerisation process:

in a first reactor, ethylene is polymerized in slurry in a first mixture comprising a diluent, hydrogen, a catalyst based on a transition metal and a cocatalyst, so as to form from 45 to 55% by weight with respect to the total weight of the composition of an ethylene homopolymer (A);

said first mixture is withdrawn from said reactor and is subjected to a reduction in pressure, so as to degas at least a portion of the hydrogen to form an at least partially degassed mixture, and said at least partially degassed mixture, together with ethylene and a $C_4$-$C_8$ alpha-olefin and, optionally, at least one other alpha.-olefin, are introduced into a subsequent reactor and the slurry polymerization is carried out therein in order to form from 45 to 55% by weight, with respect to the total weight of the composition, of a copolymer of ethylene and of $C_4$-$C_8$ alpha-olefin.

The invention also provides a process for obtaining an injection-moulded article, comprising the steps of polymerising ethylene and optionally comonomer, compounding the polyethylene composition, and then injection moulding the composition to form an article. The step of polymerising ethylene preferably comprises forming a multimodal polyethylene in at least two reactors in series.

Preferably the process for making an injection moulded article comprises the steps of:

introducing ethylene, a polymerisation catalyst and optionally an alpha-olefin containing from 3 to 12 carbon atoms into a first reactor, polymerising the ethylene in said first reactor to form a a low molecular weight fraction (A) having a melt index $MI_2$ (A) of 200-600 g/10 min;

transferring a mixture comprising said fraction (A) and the catalyst to a second reactor where further polymerisation takes place in the presence of an alpha-olefin containing from 3 to 12 carbon atoms to form a high molecular weight fraction (B);

removing from the second reactor a polyethylene composition having a density of 949-955 kg/m$^3$ and a melt index $MI_2$ between 15 and 40 g/10 min and comprising 52-58 wt % of fraction (A) based on the weight of (A)+(B);

forming said polyethylene composition into an injection moulded article.

The injection moulded article formed in the process of the invention is preferably a cap or closure.

The catalyst employed in the polymerisation process to produce the polyethylene compositions of the invention may be any catalyst(s) suitable for preparing such polyethylenes. If the polyethylene is multimodal, it is preferred that the same catalyst produces both the high and low molecular weight fractions. For example, the catalyst may be a Ziegler-Natta catalyst or a metallocene catalyst. Preferably the catalyst is a Ziegler-Natta catalyst.

In the case of a Ziegler-Natta catalyst, the catalyst used comprises at least one transition metal. Transition metal means a metal of groups 4, 5 or 6 of the Periodic Table of elements (CRC Handbook of Chemistry and Physics, 75th edition, 1994-95). The transition metal is preferably titanium and/or zirconium. A catalyst comprising not only the transition metal but also magnesium is preferably utilised. Good results have been obtained with catalysts comprising:

from 5 to 30%, preferably from 6 to 22%, most preferably 8 to 16% by weight of transition metal, from 0.5 to 20%, preferably from 2 to 18%, most preferably 5 to 15% by weight of magnesium, from 20 to 70%, preferably from 30 to 65%, most preferably 40 to 60% by weight of halogen, such as chlorine, from 0.1 to 10%, preferably from 2 to 8%, most preferably 0.5 to 5% by weight of aluminium;

the balance generally consisting of elements arising from products used for their manufacture, such as carbon, hydrogen and oxygen. These catalysts are preferably obtained by coprecipitation of at least one transition metal composition and a magnesium composition by means of a halogenated organoaluminium composition. Such catalysts are known, they have notably been described in U.S. Pat. Nos. 3,901,863, 4,292,200 and 4,617,360. The catalyst is preferably introduced only into the first polymerisation reactor, i.e. there is no introduction of fresh catalyst into the further polymerisation reactor. The amount of catalyst introduced into the first reactor is generally adjusted so as to obtain an amount of at least 0.5 mg of transition metal per litre of diluent. The amount of catalyst usually does not exceed 100 mg of transition metal per litre of diluent.

Particularly preferred catalysts contain 5 to 30% by weight of transition metal, 0.5 to 20% by weight of magnesium, 20 to 70% by weight of chlorine and 0.1 to 10% by weight of aluminium, and have a residual organic radical content in the precipitated catalyst of less than 35 wt %. These catalysts are also obtained by coprecipitation of at least one transition metal compound and a magnesium compound by means of a halogenated organoaluminium compound, but with a ratio of transition metal to magnesium of no more than about 1:1. They may optionally further comprise an electron donor. They are described in more detail in our own EP 703247B. Most preferred catalysts have the following composition:

Transition metal from 8 to 16% by weight.

Magnesium content from 5 to 15% by weight.

Chlorine content from 40 to 60% by weight.

Aluminium content less than 5% by weight.

Residual organic content less than 35% by weight.

Total alkyl benzoate content less than 20% by weight.

The cocatalyst utilised in the process is preferably an organoaluminium compound. Unhalogenated organoaluminium compounds of formula $AlR_3$ in which R represents an alkyl grouping having from 1 to 8 carbon atoms are preferred. Particularly preferred are triethylaluminium and triisobutylaluminium.

In the particularly preferred multistage polymerisation process described above for producing the composition of the invention it is preferred to utilise a Ziegler-Natta catalyst. In such a case the polymerisation temperature is generally from 20 to 130° C., preferably from 60° C. to 115° C., and more preferably from 75° C. to 110° C. The total pressure at which the process is effected is in general from 0.1 MPa to 10 MPa. In the first polymerisation reactor, the total pressure is preferably at least 2.5 MPa. Preferably, it does not exceed 51 MPa. In the further polymerisation reactor, the total pressure is preferably at least 1.3 MPa. Preferably, it does not exceed 4.3 MPa.

The period of polymerisation in the first reactor and in the further reactor is in general at least 20 minutes, preferably at least 30 minutes. It does not usually exceed 5 hours, preferably not 3 hours.

In this particularly preferred process, a slurry comprising the resin of the invention is collected at the outlet of the further polymerisation reactor. The composition may be separated from the suspension by any known means. Usually, the suspension is subjected to a pressure expansion (final expansion) so as to eliminate the diluent, the ethylene, the alpha-olefin and any hydrogen from the composition.

Typically the compositions of the invention are compounded into pellets, which may optionally then be used in the manufacture of articles. Compounding equipment and conditions are well known to those skilled in the art.

The compositions made according to the invention can be mixed with the usual processing additives for polyolefins, such as stabilizers (antioxidizing agents and/or anti-UV agents), antistatic agents and processing aids, as well as pigments. Examples include calcium stearate or zinc stearate as an acid neutraliser, Irgafos 168 as a process antioxidant, and Irganox 1010 or 1076 as a thermal antioxidant.

EXAMPLES

The meanings of the symbols used in these examples and the units expressing the properties mentioned and the methods for measuring these properties are explained below.

Melt Index

Melt indices $MI_2$ and HLMI are determined according to ISO1133 at a temperature of 190° C. under a load of 2.16 kg and 21.6 kg, respectively, are indicated in g/10 min.

Density

Density of the polyethylene was measured according to ISO1183-1 (Method A) and the sample plaque was prepared according to ASTM D4703 (Condition C) where it was cooled under pressure at a cooling rate of 15° C./min from 190° C. to 40° C.

Dynamic Rheological Analysis

Dynamic rheological measurements are carried out, according to ASTM D 4440, on a dynamic rheometer (e.g., ARES) with 25 mm diameter parallel plates in a dynamic mode under an inert atmosphere. For all experiments, the rheometer has been thermally stable at 190° C. for at least 30 minutes before inserting the appropriately stabilised (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

Shear Thinning Index SHI

Shear thinning index (SHI) is calculated according to Heino ("Rheological characterization of polyethylene fractions" Heino, E. L., Lehtinen, A., Tanner J., Seppala, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.)

The SHI value is obtained by calculating the complex viscosities 111 and moo at a constant shear stress of 1 and 100 kPa respectively. The shear thinning index $SHI_{(1/100)}$ is defined as the ratio of the two viscosities Ili and moo.

ESCR (on PCO1810 Cap Design)

Environmental stress crack resistance (ESCR) is determined on a cap made according to cap design PCO1810 having a weight of 2.9 g. The cap is screwed onto a PET-preform pre-filled with water with a torque of 25 cm·kg. The hydrostatic pressure in the PET-preform is maintained using a flexible pipe connected to its end. The cap part is entirely submerged in a 10 wt % solution of Igepal CO360. The test is done at 1 bar and 40° C.: the time taken for a pressure drop due to leakage to occur (caused by cracking of the cap) is measured. The test is done on 10 caps, and the ESCR results is calculated using the arithmetic average of the 10 test results.

All PC01810 Caps design caps were produced by injection moulding on a Nestal Synergy machine 1000-460 with an Antonin mould having 12 cap cavities. The injection conditions are displayed below:

Screw diameter: 40 mm

Injection speed values:

| Length (mm) | Speed (mm/s) | Time (s) |
| --- | --- | --- |
| 11 | 30 | 0.37 |
| 21.6 | 84 | 0.26 |
| 5.3 | 86 | 0.06 |
| 5.8 | 53 | 0.11 |

-continued

| Length (mm) | Speed (mm/s) | Time (s) |
|---|---|---|
| 3.6 | 25 | 0.14 |
| 4.1 | 18 | 0.23 |

Injection pressure: 1150 bar
Temperature of all zones: 200° C.
Mould temperature: 10° C.
Cooling time at 10° C.: 3.5s
Holding pressure: 1150 bar
Holding pressure time: 1.0 s Top Load Stiffness Test Since the injection moulding process for caps can significantly affect the final mechanical properties of the cap, stiffness (like ESCR) is measured directly on the cap rather than on a sample of the polymer used to make the cap. In the top load stiffness test, the increase in force required to push in the top plate of a cap to a maximum displacement of 1.2 mm is measured. The top of the cap is pushed in at a rate of 1 mm/minute by a 13 mm diameter punch tool having an end-point radius of curvature of 6.5 mm), using a Hounsfield H10KS universal testing machine. The force required to achieve a displacement of 0.05, 0.20, 0.25, 0.40, 0.60, 0.08, 1.0 and 1.2 mm respectively is measured.

The top load stiffness, expressed in N/mm, is the slope of the force curve between the displacements at 1.2 mm and 0.25 mm.

Flow Index

Flow index is a parameter which indicates the injection melt viscosity, and may be considered to be a measure of the flowability of the molten polymer under injection conditions: a low Flow Index indicates good flowability. It is determined during the injection process for the PC01810 caps, the injection conditions for which are described above for the ESCR measurement (including an injection temperature of 200° C.). The Flow Index is calculated by the Nestal Synergy machine 1000-460 which performs the injection moulding. During the injection process, the screw of an injection moulding machine acts as a plug to push the molten polymer into the cavity. The Flow Index is the calculated mean value of the injection pressure between two positions of the end of the screw.

FIG. 1 shows the typical variation of injection pressure as the screw is extended. The mean value of the area between positions A and B is the Flow Index. For the machine used in these measurements, A and B are located at 26 mm and 35 mm respectively, where 0 mm is initial position of the end of the screw. The Flow Index is obtained by dividing the area under the curve between these two points by the distance between them (9 mm in this case).

Impact Resistance

Notched Charpy Impact Resistance was measured according to ISO 179-1/1eA (2000) at a temperature of 23° C. on type 1 specimens (80×10×4 mm) taken from compression moulded plates obtained according to ISO 291:1997 and notched with a Type A notch.

Gel Permeation Chromatography Analysis for Molecular Weight Distribution Determination Apparent molecular weight distribution and associated averages, uncorrected for long chain branching, were determined by Gel Permeation (or Size Exclusion) Chromatography according to ISO16014-1, ISO 16014-2 and 16014-4, using a GPC-IR of Polymer Char with 3 columns PL Olexis (13 μm) Agilent of 30 cm length and a IRS MCT detector.

The solvent used was 1,2,4 trichlorobenzene at 160° C., stabilised with BHT, of 0.4 g/litre concentration. Polymer solutions of 0.3 g/litre concentration were prepared at 160° C. for two hours with stirring. The nominal injection volume was set at 200 μl and the nominal flow rate was 1 ml/min.

A relative calibration was constructed using 16 narrow molecular weight linear polystyrene standards:

| PS Standard | Molecular Weight (Mp), Da |
|---|---|
| 1 | 12200000 |
| 2 | 5030000 |
| 3 | 3080000 |
| 4 | 1400000 |
| 5 | 526000 |
| 6 | 250000 |
| 7 | 127000 |
| 8 | 63000 |
| 9 | 34800 |
| 10 | 17600 |
| 11 | 12600 |
| 12 | 5490 |
| 13 | 3500 |
| 14 | 1820 |
| 15 | 672 |
| 16 | 266 |

The elution volume, V, was recorded for each PS standards. The PS molecular weight was then converted to PE equivalent using a Q factor: −0.36490.

The calibration curve Mw Pp=f(V) was then fitted with a 3 fit order equation. All the calculations are done with GPC One software from Polymer Char.

A) Catalyst

Magnesium diethoxide was reacted with titanium tetrabutoxide for 4 hours at 140° C. in an amount such that the molar ratio of titanium to magnesium was equal to 1. The reaction product thus obtained was subsequently chlorinated and precipitated by bringing the latter into contact with an ethylaluminium dichloride solution (EADC) for 90 minutes at 45° C. The EADC/Mg ratio was 6.5 mole/mole. The obtained slurry was subsequently aged at 60° C. for 45 minutes, and then cooled at ambient temperature (<35° C.). The by-products from the chlorination reaction were removed from the slurry by washing the solid with polymerisation grade hexane at ambient temperature. The catalyst thus obtained, collected from the suspension, comprised (% by weight): Ti: 17; Cl: 41; Al: 2; Mg: 5.

B) Composition

The manufacture of a composition comprising ethylene polymers was carried out in suspension in hexane in two loop reactors connected in series and separated by a device which makes it possible continuously to carry out the reduction in pressure.

Hexane, ethylene, hydrogen, triethylaluminium and the catalysts were continuously introduced into the first loop reactor and the polymerization of ethylene was carried out in this mixture in order to form the homopolymer (A). This mixture, additionally comprising the homopolymer (A), was continuously withdrawn from the said reactor and was subjected to a reduction in pressure (~70° C., 0.11 MPa), so as to remove at least a portion of the hydrogen. The resulting mixture, at least partially degassed of hydrogen, was then continuously introduced into a second polymerization reactor, at the same time as ethylene, butene, hexane and hydrogen, and the polymerization of the ethylene and of the butene was carried out therein in order to form the ethylene/1-butene copolymer (B). The suspension comprising the composition comprising ethylene polymers was continuously withdrawn from the second reactor and this suspension was subjected to a final reduction in pressure in the presence of steam, so as to evaporate the hexane and the reactants present (ethylene, 1-butene and hydrogen) and to recover the composition in the form of a powder, which was subjected to drying in order to complete the degassing of the hexane.

The polymer powder was then transferred to a Werner and Pfleiderer ZSK40 monomodal profile screw PEO8 and compounded with an additive package described below. Additives incorporated with the resins in the Table below during compounding were 70 ppm of calcium stearate (acid neutraliser), 1500 ppm of Irgafos 168 (process antioxidant).

The other polymerisation conditions and copolymer properties (as measured on pellets) are specified in Table 1. The properties of the compositions are presented in Table 2.

TABLE 1

| polymerisation conditions | | | |
|---|---|---|---|
| EXAMPLE | 1 | 2 | CE1 |
| Reactor 1 | | | |
| C2 (g/m³ solvent) | 9.9 | 10.1 | 6 |
| H2/C2 (mole/mole) | 0.321 | 0.349 | 0.26 |
| T (° C.) | 85 | 85 | 84 |
| Residence time (h | 2 | 1.9 | 1.3 |
| Reactor 2 | | | |
| C2 (g/m³ solvent) | 8.1 | 8.7 | 7 |
| C4/C2 (mole/mole) | 0.803 | 0.849 | 0.37 |
| H2/C2 (mole/mole) | 0.041 | 0.042 | 0.17 |
| T (° C.) | 85 | 85 | 80 |
| Residence time (h) | 1.6 | 1.6 | 1.4 |

TABLE 2

| polymer properties | | | | |
|---|---|---|---|---|
| EXAMPLE | 1 | 2 | CE1 | CE2 |
| Properties of polymer fraction (A) | | | | |
| wt % (A) | 55 | 55 | 55 | — |
| MI₂(A) (g/10 min) | 420 | 400 | 255 | — |
| Density (A) (kg/m³) | 974 | 974 | 974 | — |
| Properties of polymer fraction (B) | | | | |
| MI₂(B) (g/10 min) * | 5.0 | 4.0 | 0.45 | — |
| Density (B) (kg/m³)** | 922.9 | 923.3 | 944.1 | — |
| Properties of polymer composition (after pelletisation) | | | | |
| Density (kg/m³) | 952.2 | 952.1 | 961.0 | 953.4 |
| MI₂ (g/10 min) | 28.7 | 23.7 | 3.8 | 28.7 |
| SHI₁/₁₀₀ | 3.7 | 3.4 | 25.6 | 2.1 |
| Mw/Mn | 8.8 | 9.0 | 12.3 | 5.3 |
| ESCR 1 bar, 40° C. (h) | 22 | 62 | >200 | 16 |
| Charpy @ 23° C. (kJ/m²) | 2.3 | 2.3 | 3.1 | 2.2 |
| Charpy @ −20° C. (kJ/m²) | 2.2 | 1.7 | 2.7 | 2.3 |
| Top load stiffness (N/m) | 19.0 | 19.0 | 31.9 | 19.8 |
| Flow index | 937 | 981 | 2020 | 1136 |

* calculated using the equation described in Hagström, Conference of Polymer Processing in Gothenburg, 19-21/08/1997
**calculated using Equation 1

Comparative Example 1 is included as an example of a resin suitable for caps and closures which has a relatively low melt index and therefore a high ESCR.

Comparative Example 2 is Rigidex® HD5226EA, a monomodal resin commercially available from INEOS which also has a high melt index.

The above results show that the compositions of the invention display similar stiffness and impact resistance to Comparative Example 2, but superior ESCR and flowability under injection conditions. This shows that the specific bimodal design of the inventive resins can give improved ESCR whilst maintaining or even improving flowability.

Compared with Comparative Example 1, it can be seen that the much higher melt index of the inventive resins results in substantially better flowability. Although stiffness is poorer due to the lower density, ESCR is still satisfactory.

The invention claimed is:

1. A polyethylene composition having a density of 949-955 kg/m³ and a melt index MI₂ between 15 and 40 g/10 min, which comprises a low molecular weight fraction (A) and a high molecular weight fraction (B), wherein the weight fraction of (A) is 52-58 wt % based on the weight of (A)+(B), the melt index MI₂ of (A) is 200-600 g/10 min, and the high molecular weight fraction (B) has a density of 918-928 kg/m³.

2. The composition according to claim 1, which has an MI₂ of 19 to 37 g/10 min.

3. The composition according to claim 1, which has a density of 950-954 kg/m³.

4. The composition according according to claim 1, which has a molecular weight distribution (measured by GPC analysis) Mw/Mn of 5-10.

5. The composition according to claim 1, which has a SHI₍₁,₁₀₀₎ of 2.5-8.

6. The composition according to claim 1, wherein the weight fraction of (A) is 53-57 wt %.

7. The composition according to claim 1, wherein the low molecular weight fraction (A) has an MI₂ of between 250 and 550 g/10 min.

8. The composition according to claim 1, wherein the high molecular weight fraction (B) has a density 920-926 kg/m³.

9. The composition according to claim 1, which has a density of 950 to 954 kg/m³, an MI₂ of between 20 and 35 g/10 min, a SHI₍₁,₁₀₀₎ of between 2.5 and 8 and an Mw/Mn between 5 and 10.

10. An injection moulded article comprising the composition as defined in claim 1.

11. The article according to claim 10 which is a cap or closure.

12. The composition according to claim 1, which has an MI₂ of 20 to 35 g/10 min.

13. The composition according to claim 1, which has an MI₂ of 22 to 32 g/10 min.

14. The composition according to claim 1, which has a density of 951-953 kg/m³.

15. The composition according according to claim 1, which has a molecular weight distribution (measured by GPC analysis) Mw/Mn of 7-10.

16. The composition according to claim 1, which has a SHI₍₁,₁₀₀₎ of 3-6.

17. The composition according to claim 1, wherein the weight fraction of (A) is 54-56 wt %.

18. The composition according to claim 1, wherein the low molecular weight fraction (A) has an MI₂ of between 300 and 500 g/10 min.

19. The composition according to claim 1, which has a density of 950 to 954 kg/m³, an MI₂ of between 22 and 32 g/10 min, a SHI₍₁,₁₀₀₎ of between 3 and 6 and an Mw/Mn between 7 and 10.

* * * * *